United States Patent
Starzan et al.

(10) Patent No.: US 9,690,443 B2
(45) Date of Patent: Jun. 27, 2017

(54) COMPUTER-IMPLEMENTED SYSTEMS AND METHODS FOR FACILITATING A MICRO-BLOG POST

(71) Applicant: Funny or Die, Inc., Los Angeles, CA (US)

(72) Inventors: Patrick Starzan, San Francisco, CA (US); Daniel B. Lunde, Watkinsville, GA (US)

(73) Assignee: Funny or Die, Inc., Los Angeles, CA (US)

(*) Notice: Subject to any disclaimer, the term of this patent is extended or adjusted under 35 U.S.C. 154(b) by 820 days.

(21) Appl. No.: 13/670,651

(22) Filed: Nov. 7, 2012

(65) Prior Publication Data

US 2013/0179763 A1    Jul. 11, 2013

Related U.S. Application Data

(60) Provisional application No. 61/564,363, filed on Nov. 29, 2011.

(51) Int. Cl.
| | |
|---|---|
| *G06F 17/20* | (2006.01) |
| *G06F 3/0481* | (2013.01) |
| *H04N 21/2743* | (2011.01) |
| *H04N 21/278* | (2011.01) |
| *H04N 21/443* | (2011.01) |
| *H04N 21/4725* | (2011.01) |
| *H04N 21/475* | (2011.01) |
| *H04N 21/482* | (2011.01) |

(Continued)

(52) U.S. Cl.
CPC ......... *G06F 3/0481* (2013.01); *H04N 21/278* (2013.01); *H04N 21/2743* (2013.01); *H04N 21/4438* (2013.01); *H04N 21/4725* (2013.01); *H04N 21/4758* (2013.01); *H04N 21/4828* (2013.01); *H04N 21/84* (2013.01); *H04N 21/8405* (2013.01)

(58) Field of Classification Search
CPC .. G06F 17/24; G06F 17/3089; G06F 17/2247; G06F 17/30876
See application file for complete search history.

(56) References Cited

U.S. PATENT DOCUMENTS

| | | | |
|---|---|---|---|
| 7,519,658 B1 * | 4/2009 | Anglin | G06F 15/16 709/203 |
| 8,402,357 B1 * | 3/2013 | Norwood | G06F 17/2247 715/202 |

(Continued)

OTHER PUBLICATIONS

Manning, Geoff, "URL Encode a Twitter Status Message," [online] Feb. 19, 2009 [retrieved on Jan. 23, 2015] (available at http://www.geoffmanning.com/twitter/url-encode-a-twitter-status-message).*

(Continued)

*Primary Examiner* — Stephen Hong
*Assistant Examiner* — Shahid Khan
(74) *Attorney, Agent, or Firm* — Jones Day (57) ABSTRACT

Systems and methods are provided for facilitating a microblog post. A video is provided that includes a clickable link. Upon activation of the link, a graphical interface is provided for receiving a microblog post. The graphical interface is pre-populated with an address for the video and a keyword associated with the video. Upon completion of the microblog post, the microblog post that includes the address and the keyword is published.

10 Claims, 7 Drawing Sheets

(51) Int. Cl.
*H04N 21/84* (2011.01)
*H04N 21/8405* (2011.01)

(56) References Cited

U.S. PATENT DOCUMENTS

| | | | | |
|---|---|---|---|---|
| 2007/0091093 A1* | 4/2007 | Li | ..................... | G06F 17/30017 345/473 |
| 2011/0191339 A1* | 8/2011 | Ramanathan | ........... | G06F 17/30 707/732 |
| 2012/0066212 A1* | 3/2012 | Jennings | ........... | G06F 17/30144 707/723 |

OTHER PUBLICATIONS

Petrescu, "Twitter Status URL's and Ampersands," [online] Apr. 26, 2010 [retrieved on Jan. 24, 2015] (available at http://www.kilometer0.com/blog/2010/01/21/twitter-status-urls-and-ampersands/).*
Manning, Geoff, "Url Encode a Twitter Status Message," [online] Feb. 19, 2009 [retrieved on Jan. 23, 2015] (available at http://www.geoffmanning.com/twitter/url-encode-a-twitter-status-message/).*
Dybwad, Barb "Tweet Success: Why We Love Twitter's 140 Character Limit," [online] Aug. 25, 2009 [retrieved May 28, 2015] (available at https://web.archive.org/web/20090825205245/http://mashable.com/2009/08/22/twitter-140-character-limit/).*
Jeremy, "How to Make Links in Your YouTube Videos," [online] Dec. 19, 2010 [retrieved on Jan. 26, 2015] (available at http://howontheweb.com/how-to-make-links-in-your-youtube-videos/).*
Manning, Geoff, "URL Encode a Twitter Status Message," [online] Mar. 26, 2009 [retrieved on Jan. 23, 2015] (available at http://www.geoffmanning.com/twitter/url-encode-a-twitter-status-message/).*
Wikipedia, the free encyclopedia, "Tag (metadata)," [online] Oct. 7, 2010 [retrieved May 28, 2015] (available at https://web.archive.org/web/20101007100752/http://en.wikipedia.org/wiki/Hashtag#Hash_tags).*
Dybwad, Barb "Tweet Success: Why We Love Twitters 140 Character Limit," [online] Aug. 25, 2009 [retrieved May 28, 2015] (available at https://web.archive.org/web/20090825205245/http://mashable.com/2009/08/22/twitter-140-character-limit/).*
Dybwad, Barb "Tweet Success: Why We Love Twitter's 140 Character Limit," Aug. 25, 2009 (https://web.archive.org/web/20090825205245/http://mashable.com/2009/08/22/twitter-140-character-limit/).*
Wikipedia, the free encyclopedia, "Tag (metadata)," Oct. 7, 2010 (http://en.wikipedia.org/wiki/Hashtag#Hash_tags).*
Jeremy, "How to Make Links in Your YouTube Videos," Dec. 19, 2010 (http://howontheweb.com/how-to-make-links-in-your-youtube-videos/).*
Manning, Geoff, "URL Encode a Twitter Status Message," Mar. 26, 2009 (http://www.geoffmanning.com/twitter/url-encode-a-twitter-status-message/).*
Stelzner, Michael, "How to Add Retweet Buttons in your PDF Documents," Nov. 3, 2009 (http://www.socialmediaexaminer.com/how-to-add-retweet-buttons-in-your-pdf-documents).*
Ikipedia, the free encyclopedia, "Tag (metadata)," Oct. 7, 2010 (http://en.wikipedia.org/wiki/Hashtag#Hash_tags).*

* cited by examiner

COMPUTER-IMPLEMENTED SYSTEMS AND METHODS FOR FACILITATING A MICRO-BLOG POST

CROSS REFERENCE TO RELATED APPLICATIONS

This application claims priority to U.S. Provisional Patent Application No. 61/564,363, filed Nov. 29, 2011, entitled "Computer-Implemented Systems and Methods for Facilitating a Micro-Blog Post," the entirety of which is herein incorporated by reference.

TECHNICAL FIELD

This document relates generally to social media communication and more particularly to facilitating message posting associated with a video.

BACKGROUND

As Internet bandwidth capabilities increase, on-demand video continues to grow in popularity. The concurrent growth in social media technology facilitates the generation of vast amounts of meta-content. Such meta-content often includes postings on social media websites (e.g., Twitter, Facebook, MySpace), commenting or reviewing on-demand video that is available for download via the Internet.

SUMMARY

In accordance with the teachings herein, systems and methods are provided for facilitating a microblog post. A video is provided that includes a clickable link. Upon activation of the link, a graphical interface is provided for receiving a microblog post. The graphical interface is pre-populated with an address for the video and a keyword associated with the video. Upon completion of the microblog post, the microblog post that includes the address and the keyword is published.

As another example a system for facilitating a microblog post can include a video and a clickable link embedded in the video. The system may further include a graphical interface for receiving a microblog post, where the graphical interface is accessed when the clickable link is activated, where the graphical interface is pre-populated with an address for the video and a keyword associated with the video, and where upon completion of the microblog post, the microblog post that includes the address and the keyword is published.

As further examples, the clickable link may include the keyword. The keyword may be a hashtag. The keyword may be preceded by a # symbol. The video may be displayed on FunnyorDie or YouTube. The microblog may be Twitter. The microblog post may a Twitter Tweet, a Facebook post, or a MySpace post. The clickable link may cover a portion of the video. The clickable link may be activated by clicking on the link using a pointing device. The clickable link may be activated by clicking on the video using a pointing device. The graphical interface may be pre-populated according to: address #keyword; where address is the address for the video, and keyword is the keyword associated with the video. Using the clickable link and graphical interface for generating a microblog post about the video may enable use of a consistent keyword among multiple users when referencing the video. The keyword may be searchable.

DETAILED DESCRIPTION

Figure 1:
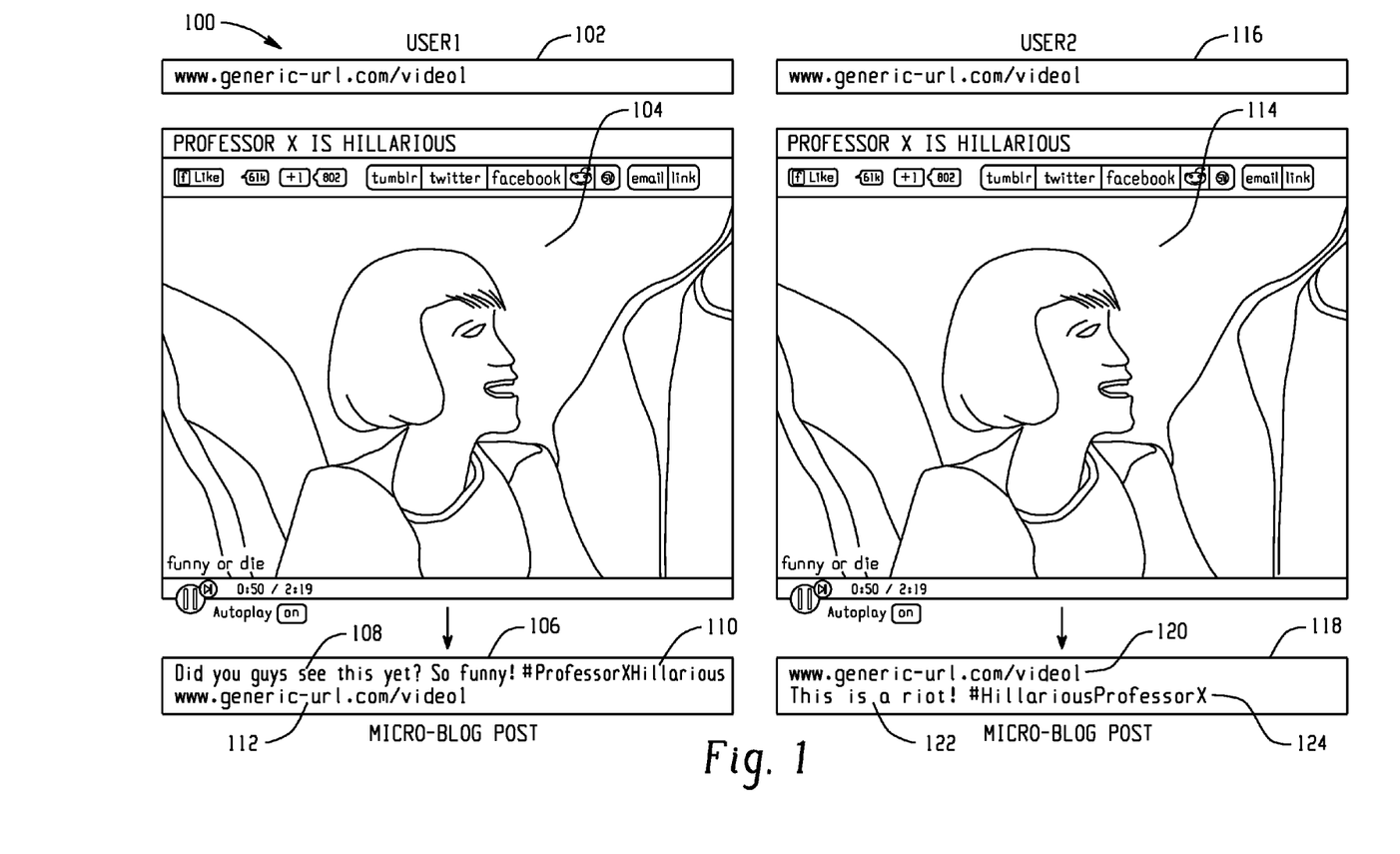
FIG. 1 is a diagram depicting posting of comments related to a video.

FIG. 1 is a diagram depicting posting of comments related to a video. The development of networking technologies, including the development of the Internet has resulted in the increased availability of video on demand to a wider audience of viewers. Download transmission rates are now sufficiently fast to allow a user to watch a video on demand with little to no buffering or other delays. Reductions in the cost of bandwidth also have made the streaming of on demand video more practical for a larger set of video providers. For example, websites such as FunnyorDie.com and YouTube.com are able to stream very high volumes of video every day.

Concurrent with the rise of on demand Internet video has come the rise in popularity of social media outlets. Social media outlets offer users the opportunity to post content regarding a wide variety of topics, such as their activities, photos, political thoughts, their mood, and their opinions on a wide range of topics. Such content postings are then made available to other users who are noted as being the poster's friends or to the public at large, who may then also comment on the topic at hand or on the original poster's content posting.

These two technological developments can be combined, such as when a video is provided and viewed on demand via the Internet, and the user subsequently posts their opinion or other thoughts regarding the video on a social networking site. For example, a user may watch a video at FunnyorDie.com and then traverse the internet to Twitter.com to post a message about the FunnyorDie.com video. In another example, a user watches a video using YouTube.com and then posts a comment about the video on their Facebook wall or MySpace feed.

A social media site may receive millions of postings on a vast array of topics every day. Thus, issues may arise when attempting to organize those postings so that relevant data may be made available to users on request. For example, when a user wishes to read content or other postings related to a video of interest, they would benefit from a mechanism that enables the user to quickly search for and access the relevant postings.

Such a mechanism may be provided through the use of keywords. A keyword is a word that may be entered into a search engine, wherein the search engine retrieves content, such as social media site postings, that are associated with the entered keyword. Such keywords may take a variety of forms. For example, the Twitter social media site has adopted the use of "hashtags" that are used as keywords for locating relevant Twitter posts ("tweets"). A hashtag often comprises a pound symbol (#) followed by a keyword. For example, a posting about dolphins may be associated with the keyword "#dolphins" by including that hashtag in the posting. In this manner, when someone searches by the keyword "dolphins" or "#dolphins," the Twitter post that includes the hashtag, #dolphins, in the posting text will be located.

While keywords may aid in the location of postings that are relevant to a topic of interest, certain postings may be missed if the use of keywords is not consistent across all posts on a topic. Such a scenario is illustrated in FIG. 1. In FIG. 1, a first user accesses a video at an address 102 entered into a web browser. Upon entering the address 102, the user is provided the video 104 entitled "Professor X is hilarious" in streaming form for viewing. If the user wishes to comment on the video 104, the user accesses a social media site, such as Twitter, and enters their comment in the graphical interface for making a post, as shown at 106. The post includes the user comment, "Did you guys see this yet? So funny!" at 108, a keyword in the form of a hashtag, #ProfessorXHillarious at 110, and an address where the video can be located at 112.

A second user also accesses the video at 114 by entering the address into the web browser, as shown at 116. The second user also wishes to comment on the post using the social media graphical interface at 118. The second user's post includes an address for accessing the video at 120, a user comment, "This is a riot!" at 122, and a keyword in the form of a different hashtag, #HillariousProfessorX at 124.

The two social media site postings entered by User 1 and User 2 in FIG. 1 should be made easily available to any user who wishes to view content or postings related to the Professor X video. However, because the two users entered different keywords for identifying their postings (i.e., #ProfessorXHillarious and #HillariousProfessorX), when the user searches using one of those keywords (e.g., #ProfessorXHillarious), that user would not locate the other post (e.g., the second post labeled with the #HillariousProfessorX keyword). This result may be sub-optimal.

Figure 2:
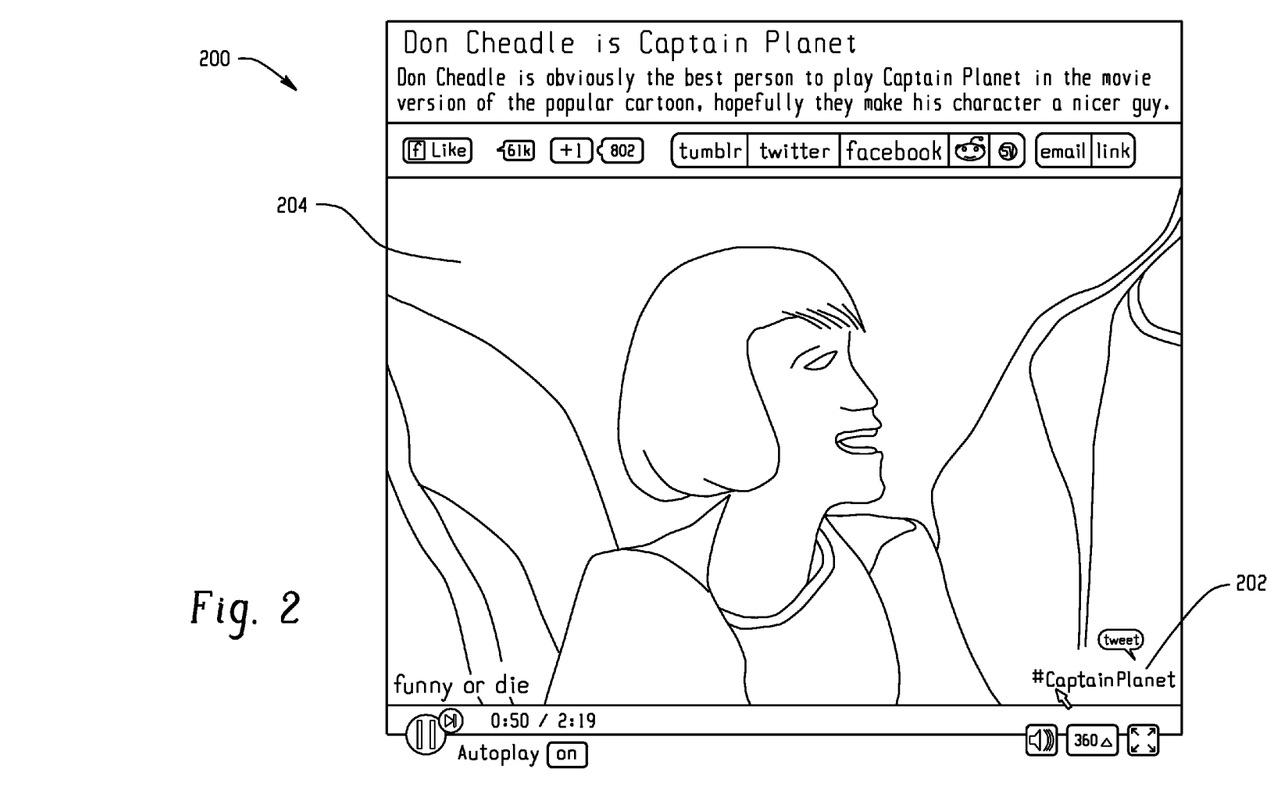
FIG. 2 depicts a video that includes an embeddable keyword that facilitates consistent keyword usage across social media postings.

FIG. 2 depicts a video that includes an embeddable keyword link that facilitates consistent keyword usage across social media postings. To help address the above identified issue with inconsistent keywords (e.g., hashtags) across multiple social media postings, a keyword link 202 may be embedded into the video 204 itself, such that when the video or a portion of the video is clicked (e.g., the portion of the video that includes the keyword acts as a link), a graphical interface for generating a social media posting may be provided that is pre-populated with certain data such as a keyword associated with the video. If the pre-populated keyword remains in the social media posting, then that common keyword will make the posting available when the embedded keyword is searched. If all users utilize the embedded keyword 202 when making social media postings related to the video 204, then all of those postings will be easily accessible when performing a search for content related to the video 204.

A link may be embedded into a video using a variety of mechanisms. For example, certain websites provide functionality for incorporating links into a video (e.g., LinkedTube.com). By entering data related to the video and the link, code may be generated that facilitates embedding of the video into a webpage with the embedded keyword link. The entered data may include the address of the video, the content to be displayed on the video for the link (e.g., the hashtag or keyword), and the address to which the user should be directed when clicking on the link (e.g., the social media or microblog posting graphical interface that is pre-populated with the video address and the embedded keyword). Other video hosting services, such as YouTube, may offer similar functionality for embedding links into videos.

Figure 3:
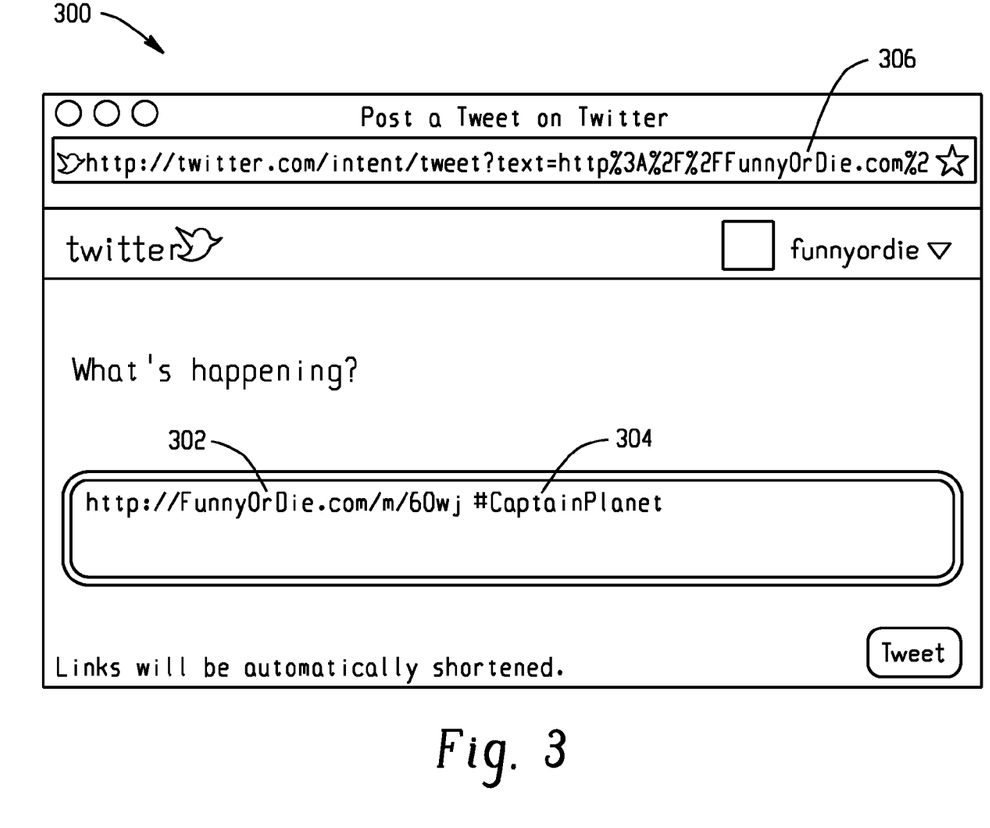
FIG. 3 depicts a graphical interface for receiving a microblog post.

In the example of FIG. 2, a video that depicts Don Cheadle as Captain Planet is displayed at 204. The video includes an embedded keyword at 202, in the form of a hashtag, #CaptainPlanet. When a user clicks the link at 202, a graphical interface is opened for generating a microblog or social media post. FIG. 3 depicts a graphical interface for receiving a microblog post. The graphical interface of FIG. 3 is provided to a user, such as via a pop-up window, when the user clicks the embedded link depicted in FIG. 2. The graphical interface is pre-populated at 302 with the address for the video as well as the keyword included with the clickable link in FIG. 2 at 304. The user may then edit the pre-populated graphical interface to personalize the posting, such as by entering their opinion of the video. When the post is completed by the user, the post that includes the address and the keyword is published for other users to access and view.

The pre-populated data provides a mechanism for subsequent users to find the new posting using the keyword 304 and to find the video, using the address at 302. The graphical interface may be pre-populated using a variety of mechanisms. For example, the graphical interface in FIG. 3 is pre-populated using data a querystring, shown at 306, that is included in the web address activated by clicking on the embedded link.

Figure 4:
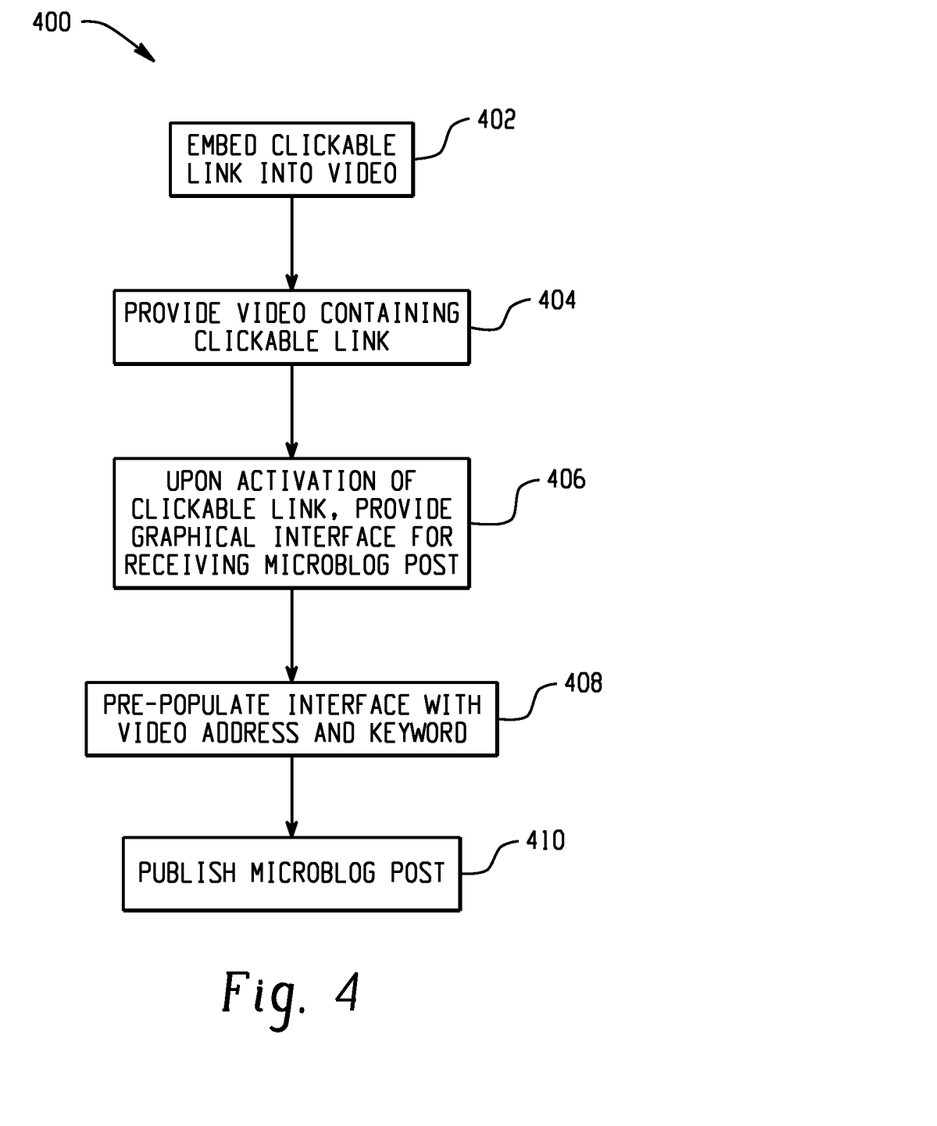
FIG. 4 is a flow diagram depicting a computer-implemented method of facilitating a microblog post.

FIG. 4 is a flow diagram depicting a computer-implemented method of facilitating a microblog post. At 402, a clickable link is embedded into a video. At 404, the video that includes the clickable link is provided, such as to a requesting user. At 406, upon activation of the link, a graphical interface is provided for receiving a microblog post, such as a Twitter, Facebook, or MySpace posting. At 408, the graphical interface is pre-populated with an address for the video and a keyword associated with the video (e.g., a hashtag). At 410, upon completion of the microblog post (e.g., upon the user clicking a "Tweet" or "Submit Post" button), the microblog post that includes the pre-populated address and keyword, is published to the microblog.

Figure 5:
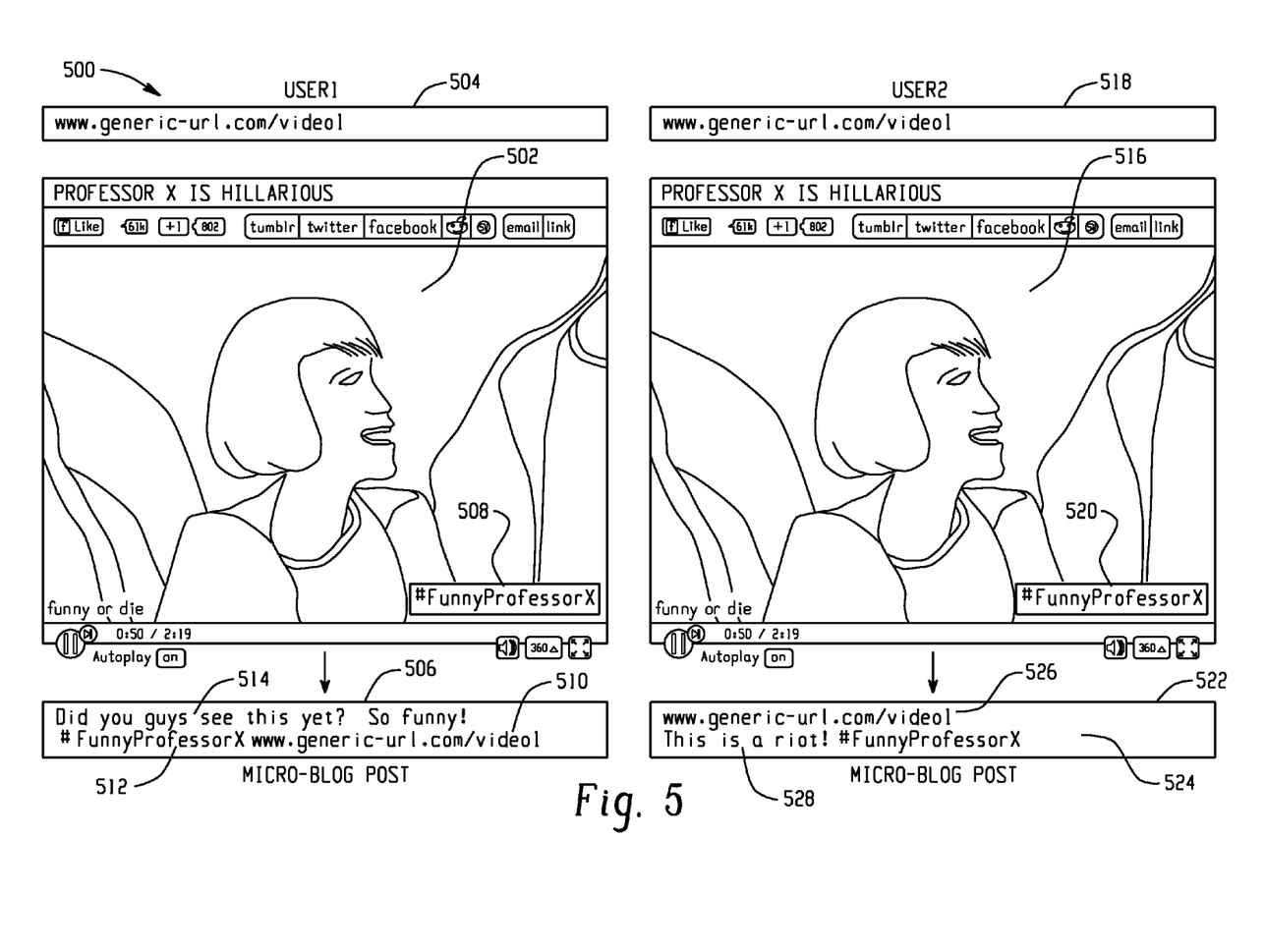
FIG. 5 depicts an example of a microblog post generation using a keyword embedded into a video.

FIG. 5 depicts an example of a microblog post generation using a keyword embedded into a video. A first user accesses a video 502 about Professor X by entering an address 504 for the video into a web browser. After viewing the video, User 1 decides to make a microblog post containing his opinion of the video. The first user accesses a graphical interface 506 for generating the microblog post by clicking on a link 508 embedded into the video. The graphical interface 506 is pre-populated with an address for the video 510 and the keyword 512 for the video, which matches the embedded link 508. The first user then personalizes the microblog post by adding a comment at 514.

A second user also accesses the video at 516 via the video address 518. When the second user clicks the embedded link at 520, the second user is provided a graphical interface at 522 that is pre-populated with the keyword 524 and the address for the video at 526. The second user personalizes their microblog post at 528, and upon completing the post, the second user submits the post for publishing for other users to view.

Because both the first and second users utilized the embedded links 508 and 520 included in the video, the two users' keywords that are included in their microblog posts are consistent. The consistent use of keywords simplifies searching for the posts that are relevant to the video content. By searching for the keyword shown in the embedded link,

FunnyProfessorX, a subsequent user will be able to access both of the depicted microblog posts without missing any relevant content.

While examples have been used to illustrate the inventive concepts, many other variations of the described embodiments fall within the scope of the invention. For example, in addition to embedding links into video content, other types of content could include embedded links such as image or picture content.

Figure 6A:
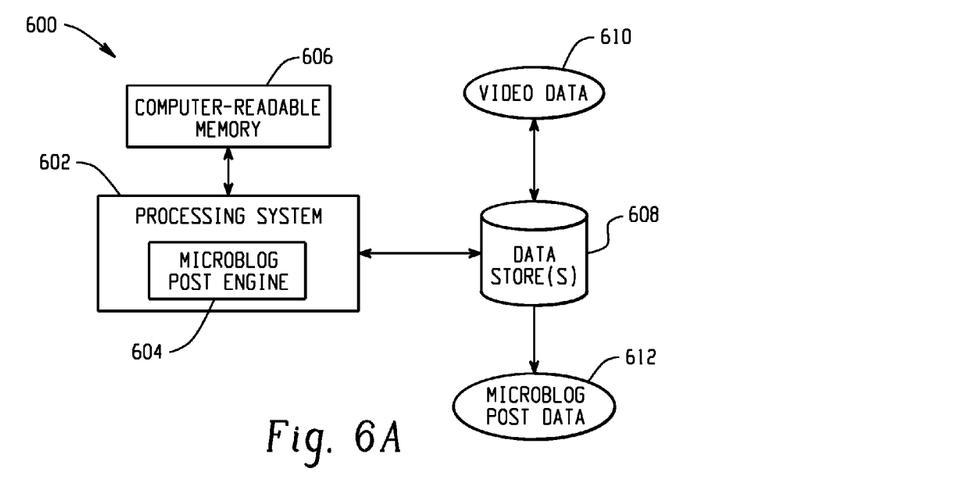
FIGS. 6A, 6B, and 6C depict example systems for use in implementing a microblog post engine.
Figure 6B:
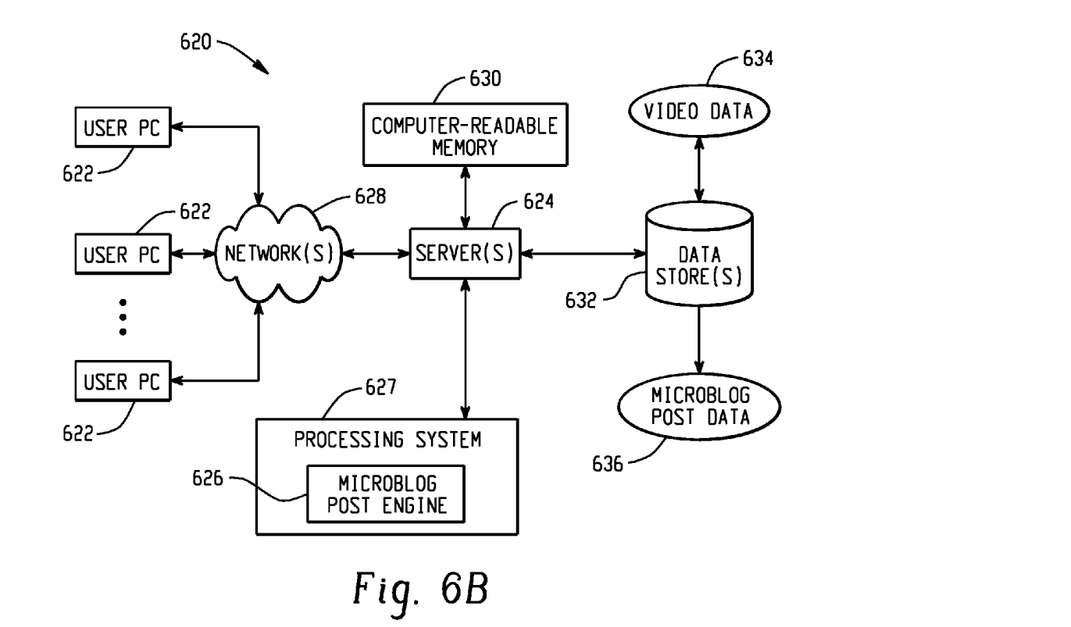
Figure 6C:
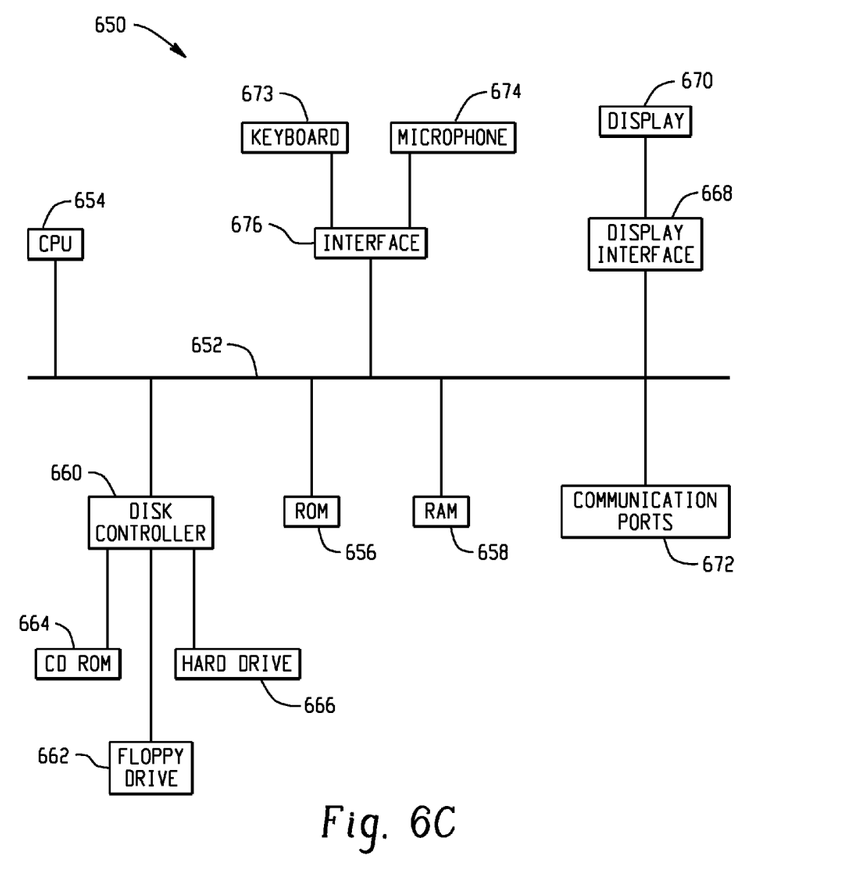

FIGS. 6A, 6B, and 6C depict example systems for use in implementing a microblog post engine. For example, FIG. 6A depicts an exemplary system 600 that includes a standalone computer architecture where a processing system 602 (e.g., one or more computer processors) includes a microblog post engine 604 being executed on it. The processing system 602 has access to a computer-readable memory 606 in addition to one or more data stores 608. The one or more data stores 608 may include video data 610 as well as microblog post data 612.

FIG. 6B depicts a system 620 that includes a client server architecture. One or more user PCs 622 accesses one or more servers 624 running a microblog post engine 626 on a processing system 627 via one or more networks 628. The one or more servers 624 may access a computer readable memory 630 as well as one or more data stores 632. The one or more data stores 632 may contain video data 634 as well as microblog post data 636.

FIG. 6C shows a block diagram of exemplary hardware for a standalone computer architecture 650, such as the architecture depicted in FIG. 6A that may be used to contain and/or implement the program instructions of system embodiments of the present invention. A bus 652 may serve as the information highway interconnecting the other illustrated components of the hardware. A processing system 654 labeled CPU (central processing unit) (e.g., one or more computer processors), may perform calculations and logic operations required to execute a program. A processor-readable storage medium, such as read only memory (ROM) 656 and random access memory (RAM) 658, may be in communication with the processing system 654 and may contain one or more programming instructions for performing the method of implementing a microblog post engine. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 660 interfaces one or more optional disk drives to the system bus 652. These disk drives may be external or internal floppy disk drives such as 662, external or internal CD-ROM, CD-R, CD-RW or DVD drives such as 664, or external or internal hard drives 666. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 660, the ROM 656 and/or the RAM 658. Preferably, the processor 654 may access each component as required.

A display interface 668 may permit information from the bus 652 to be displayed on a display 670 in audio, graphic, or alphanumeric format. Communication with external devices may optionally occur using various communication ports 672.

In addition to the standard computer-type components, the hardware may also include data input devices, such as a keyboard 673, or other input device 674, such as a microphone, remote control, pointer, mouse and/or joystick.

As additional examples, for example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of facilitating a microblog post, comprising:

providing a video that includes a clickable link in the video, wherein the clickable link displays a search term associated with the video, the search term being a hash tag identified search term being formatted according to # search term in the clickable link;

upon activation of the clickable link that is displayed in the video via a click operation on the hash tag identified search term, providing a graphical interface for receiving a microblog post, wherein the graphical interface is pre-populated with an address for the video and the hash tag identified search term associated with the video, and wherein upon completion of the microblog post, the microblog post that includes the address and the hash tag identified search term is published;

wherein upon entering the search term in a search engine, a link to the video that includes the clickable link that displays the hash tag identified search term is provided on a graphical user interface for selection;

wherein, following publishing of the microblog post, clicking on the address in the published microblog post transitions a party to the video that includes the clickable link.

2. The method of claim 1, wherein the video is displayed via an online accessible repository of streaming videos.

3. The method of claim 1, wherein the microblog enforces text message length limitations on microblog posts.

4. The method of claim 1, wherein the clickable link covers a portion of the video.

5. The method of claim 1, wherein the clickable link is activated by clicking on the link using a pointing device.

6. The method of claim 1, wherein the clickable link is activated by clicking on the video using a pointing device.

7. The method of claim 1, wherein the graphical interface is pre-populated according to:

"#search term address";

wherein address is the address for the video, and search term is the search term associated with the video.

8. The method of claim 1, wherein using the clickable link and graphical interface for generating a microblog post about the video enables use of a consistent keyword among multiple users when referencing the video.

9. The method of claim 1, further comprising embedding the clickable link into the video.

10. A system for facilitating a microblog post, comprising:
a video;
a clickable link embedded in the video, wherein the clickable link displays a search term associated with the video, the search term being a hash tag identified search term being formatted according to # search term in the clickable link; and
a graphical interface for receiving a microblog post, wherein the graphical interface is accessed when the clickable link is activated via a click operation on the hash tag identified search term, wherein the graphical interface is pre-populated with an address for the video and the hash tag identified search term associated with the video, and wherein upon completion of the microblog post, the microblog post that includes the address and the hash tag identified search term is published, wherein upon entering the search term in a search engine, a link to the video that includes the clickable link that displays the hash tag identified search term is provided on a graphical user interface for selection, wherein, following publishing of the microblog post, clicking on the address in the published microblog post transitions a party to the video that includes the clickable link.

* * * * *